(12) United States Patent
Wiese

(10) Patent No.: US 10,094,340 B2
(45) Date of Patent: Oct. 9, 2018

(54) SENSOR DEVICE FOR DETERMINING A DISPLACEMENT OF A SHAFT

(71) Applicant: Continental Automotive GmbH, Hannover (DE)

(72) Inventor: Peter Wiese, Kelkheim (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 90 days.

(21) Appl. No.: 15/127,096

(22) PCT Filed: Jul. 14, 2015

(86) PCT No.: PCT/EP2015/066035
§ 371 (c)(1),
(2) Date: Sep. 19, 2016

(87) PCT Pub. No.: WO2016/008872
PCT Pub. Date: Jan. 21, 2016

(65) Prior Publication Data
US 2018/0171941 A1    Jun. 21, 2018

(30) Foreign Application Priority Data
Jul. 16, 2014 (DE) .................. 10 2014 213 869

(51) Int. Cl.
*G01D 5/20* (2006.01)
*G01D 5/241* (2006.01)
*F02M 26/48* (2016.01)

(52) U.S. Cl.
CPC ............. *F02M 26/48* (2016.02); *G01D 5/202* (2013.01); *G01D 5/2412* (2013.01)

(58) Field of Classification Search
CPC ...... F02M 26/48; G01D 5/202; G01D 5/2412; G01D 5/145; G01D 5/2013; G01D 5/2046;
(Continued)

(56) References Cited

U.S. PATENT DOCUMENTS

| 4,623,840 A | 11/1986 | Fujimura et al. ........ 324/207.16 |
| 6,034,624 A | 3/2000 | Goto et al. ............... 340/870.32 |

(Continued)

FOREIGN PATENT DOCUMENTS

| CN | 101331563 A | 12/2008 | ............... G01D 5/14 |
| CN | 103256911 A | 8/2013 | ............. G01B 21/22 |

(Continued)

OTHER PUBLICATIONS

German Office Action, Application No. 102014213869.8, 7 pages, dated Feb. 18, 2015.

(Continued)

*Primary Examiner* — Thomas Moulis
*Assistant Examiner* — John Bailey
(74) *Attorney, Agent, or Firm* — Slayden Grubert Beard PLLC

(57) ABSTRACT

The present disclosure relates to sensor devices and the teachings may be applied to a sensor for determining a displacement of a shaft along its longitudinal axis. In some embodiments, a sensor device may include a sensor unit and a detection element. The sensor element is disposed at a fixed radial distance from the longitudinal axis. The detection element is arranged between the shaft and the sensor unit and coupled to the shaft. The side of the detection element facing away from the axis comprises a convex shape. A gap distance defined between the detection element and the sensor unit varies over an extent of the sensor unit perpendicularly with respect to the longitudinal axis and independently of a tilting angle of the shaft. The sensor unit generates a shaft displacement signal dependent on a displacement of the detection element in relation to the sensor unit along the longitudinal axis.

9 Claims, 3 Drawing Sheets

(58) Field of Classification Search
CPC ... G01D 5/2216; F15B 15/28; F15B 15/2861; Y10T 137/8242
USPC .............................. 123/568.21; 73/114.74; 324/207.15–207.16, 207.18; 137/554; 340/870.32
See application file for complete search history.

(56) References Cited

U.S. PATENT DOCUMENTS

| | | | | |
|---|---|---|---|---|
| 6,177,793 | B1* | 1/2001 | Shinjo | G01R 33/09 324/207.21 |
| 6,448,762 | B1* | 9/2002 | Kono | F02D 9/10 123/617 |
| 7,322,374 | B2 | 1/2008 | Gebauer et al. | 137/554 |
| 8,281,771 | B2* | 10/2012 | Lim | F02M 26/54 123/568.21 |
| 8,919,375 | B2* | 12/2014 | Duboy | F16K 37/0033 137/554 |
| 2001/0045827 | A1* | 11/2001 | Shinjo | G01R 33/09 324/207.21 |
| 2003/0075159 | A1* | 4/2003 | Vamvakitis | F02D 9/12 123/568.21 |
| 2005/0046415 | A1 | 3/2005 | Kato et al. | 324/207.24 |
| 2005/0116706 | A1* | 6/2005 | Keane | G01D 5/145 324/207.25 |
| 2006/0038557 | A1* | 2/2006 | Johnson | G01D 5/145 324/207.25 |
| 2006/0066296 | A1* | 3/2006 | Kuroyanagi | G01D 5/145 324/207.2 |
| 2006/0170416 | A1* | 8/2006 | Sekiya | G01D 5/145 324/207.13 |
| 2007/0107708 | A1* | 5/2007 | Uchiyama | F02D 9/1065 123/568.18 |
| 2007/0108968 | A1* | 5/2007 | Ootawara | F02D 9/105 324/207.25 |
| 2009/0021244 | A1 | 1/2009 | May | 324/207.2 |
| 2009/0273490 | A1* | 11/2009 | Ishikawa | G05G 9/047 341/20 |
| 2010/0188074 | A1* | 7/2010 | Matsumoto | G01D 5/145 324/207.2 |
| 2010/0207616 | A1* | 8/2010 | Wolschlager | G01D 1/00 324/207.25 |
| 2010/0219814 | A1* | 9/2010 | Nishiura | B66B 1/3492 324/207.24 |
| 2014/0202436 | A1* | 7/2014 | Inagaki | F02D 41/0065 123/568.21 |
| 2015/0330335 | A1* | 11/2015 | Shimada | F02M 25/0756 123/568.16 |

FOREIGN PATENT DOCUMENTS

| | | | | |
|---|---|---|---|---|
| DE | 4120643 | A1 | 12/1992 | ............ F16D 25/08 |
| DE | 19804414 | A1 | 8/1999 | .............. G01B 7/02 |
| DE | 20115060 | U1 | 1/2002 | ................ F01L 3/08 |
| DE | 69707536 | T2 | 6/2002 | .............. G01B 7/02 |
| DE | 102005029904 | A1 | 1/2007 | .............. F15B 15/10 |
| DE | 102006031139 | A1 | 1/2008 | .............. G01B 7/02 |
| DE | 102013214358 | A1 | 1/2015 | ............ F16H 63/42 |
| WO | 2016/008872 | A1 | 1/1916 | .............. G01D 5/20 |

OTHER PUBLICATIONS

International Search Report and Written Opinion, Application No. PCT/EP2015/066035, 13 pages, dated Aug. 31, 2015.

Chinese Office Action, Application No. 201580017669.4, 13 pages, dated Apr. 18, 2018.

* cited by examiner

SENSOR DEVICE FOR DETERMINING A DISPLACEMENT OF A SHAFT

CROSS-REFERENCE TO RELATED APPLICATIONS

This application is a U.S. National Stage Application of International Application No. PCT/EP2015/066035 filed Jul. 14, 2015, which designates the United States of America, and claims priority to DE Application No. 10 2014 213 869.8 filed Jul. 16, 2014, the contents of which are hereby incorporated by reference in their entirety.

TECHNICAL FIELD

The present disclosure relates to sensor devices and the teachings may be applied to a sensor for determining a displacement of a shaft along its longitudinal axis.

BACKGROUND

DE 697 07 536 T2 describes a linear position-detection device of the induction type, which generates alternating current signals on the basis of excitation by means of a single-phase alternating current signal and outputs said signals which indicate multi-phase amplitude function characteristics in reaction to a linear position to be detected. For this purpose, the linear position-detection device has a cylindrically shaped winding section and a rod-shaped variable magnetic coupling section which is arranged between the windings of the winding section at a suitable distance.

DE 201 15 060 U1 describes an actuator which does not have a camshaft and has the purpose of activating a poppet valve of an internal combustion engine with a tappet which is moved in an oscillating fashion and is coupled to the poppet valve, wherein a target ring which is slotted at least once and is embodied as a separate, prefabricated part which is composed of a material on an FE basis or of a ferritic material is attached to the outer circumference of the tappet. A sensor which surrounds the tappet and operates inductively and at low frequencies determines the position of the tappet.

DE 41 20 643 A1 relates to a friction clutch for motor vehicles having a clutch plate which can be clamped in between two components and is seated in a rotationally fixed fashion on a transmission shaft, a clutch spring for clamping in the clutch plate between the two components, a clutch-activation device having a slave device near to the clutch, a master device remote from the clutch and a transmission device arranged between them, wherein a travel sensor, which is arranged in or on the slave cylinder, is arranged in a slave device near to the clutch. For the purpose of capacity detection of a travel signal, an annular piston is provided with an electrically conductive coating on its outer circumference. The annular piston is accommodated in a projection which forms a capacitor with the coating of the piston.

DE 10 2006 031 139 A1 relates to a device for the contactless and wear-free measurement of the absolute linear position with planar coils of equipment elements, machine elements or activation elements in a range from 10 mm to 200 mm, wherein this element can itself perform the function of the rotor. The losses of the electromagnetic field which arise as a result of eddy currents in the rotor are measured on two planar triangular coils which are arranged differentially in a plane. These losses are proportional to the area of the triangular coils covered by the rotor and are therefore proportional to the absolute position. A second pair of coils is arranged in a second plane, which compensates for changes in the distance from the rotor.

DE 10 2013 214 358 A1 relates to a measuring device for a manual shift transmission for sensing the position of a shifting shaft in relation to a housing comprising a sensor arrangement and a sensor target, wherein the sensor arrangement comprises an inductive sensor by means of which a distance between the inductive sensor and the sensor target is detected, and the sensor target is fabricated from a conductive material, wherein the shape of the sensor target is configured such that the distance between the inductive sensor and the sensor target varies as a function of the position of the shifting shaft in relation to the housing.

U.S. Pat. No. 4,623,840 A describes an actuator which comprises a cylindrical body on the outer surface of which a coil is formed and a piston which serves as a core is arranged in the body. Displacement of the piston can be detected by means of a detection circuit, as a result of a change in the coil induction owing to the displacement of the piston.

SUMMARY

The teachings of the present disclosure may be applied to a sensor device for determining a displacement of a shaft along its longitudinal axis which permits a high level of precision and reliability of the determination of the displacement.

In some embodiments, a sensor device (1) for determining a displacement (T) of a shaft (3) along its longitudinal axis (L), may include: a sensor unit (5) which is radially arranged at a first distance (A) from the longitudinal axis (L), wherein the shaft (3) can be displaced in relation to the sensor unit (5) along the longitudinal axis (L), a detection element (7) which is arranged between the shaft (3) and the sensor unit (5) and is fixedly coupled to the shaft (3) radially at a second distance (R) from the longitudinal axis (L), wherein a side of the detection element (7) facing away from the longitudinal axis (L) is convex with respect to a plane perpendicular with respect to the longitudinal axis (L), in such a way that a gap distance (B) between the detection element (7) and the sensor unit (5) varies over an extent of the sensor unit (5) perpendicularly with respect to the longitudinal axis (L) and independently of a tilting angle (a) of the shaft (3), the sensor unit (5) is designed to generate a shaft displacement signal which is dependent on a displacement of the detection element (7) in relation to the sensor unit (5) along the longitudinal axis (L).

In some embodiments, a curvature of the side of the detection element (7) which faces away from the longitudinal axis (L) is embodied in the plane perpendicular to the longitudinal axis (L) so as to be essentially equal to a curvature of a circle in this plane, the radius of which circle corresponds to the second distance (R) of the detector element (7) from the longitudinal axis (L).

In some embodiments, the detection element (7) is embodied as a lamellar.

In some embodiments, the detection element (7) is embodied as a conductor loop.

In some embodiments, the sensor unit (5) comprises an exciter coil (11) and at least one receiver coil (13, 15), wherein the exciter coil (11) and the at least one receiver coil (13, 15) are embodied in such a way that a magnetic field which is generated by the exciter coil (11) induces a respective voltage in the at least one receiver coil (13, 15) as a function of the displacement of the detection element (7) with respect to the sensor unit (5).

In some embodiments, the detection element (7) is embodied as a permanent magnet, and the sensor unit (5) comprises a Hall sensor which is penetrated, as a function of the displacement of the permanent magnet with respect to the sensor unit (5), by a magnetic field which is brought about by the permanent magnet.

In some embodiments, the detection element (7) is embodied as a permanent magnet, and the sensor unit (5) comprises a magneto-resistive sensor element which is penetrated, as a function of the displacement of the permanent magnet with respect to the sensor unit (5), by a magnetic field which is brought about by the permanent magnet.

In some embodiments, the detection element (7) is embodied as at least a first electrode of a capacitor, and the sensor unit (5) comprises at least a second electrode of the capacitor.

Some embodiments may include an exhaust gas recirculation valve which is arranged in the exhaust gas train of an internal combustion engine in order to control an exhaust gas flow, comprising an inlet and an outlet, a valve seat with a valve disk which is coupled to a shaft (3) embodied as a valve rod, with the result that the position of said valve disk with respect to the valve seat can be adjusted by means of a displacement (T) of the shaft (3) along its longitudinal axis (L), wherein the exhaust gas recirculation valve is designed to control the exhaust gas flow from the inlet to the outlet as a function of the position of the valve disk with respect to the valve seat, and a sensor device (1) as described above for determining the displacement (T) of the shaft (3).

BRIEF DESCRIPTION OF THE DRAWINGS

Exemplary embodiments of the invention are explained below with respect to the schematic drawings, in which.

Elements with the same design or function are provided with the same reference symbols in all the figures.

DETAILED DESCRIPTION

Figure 1:
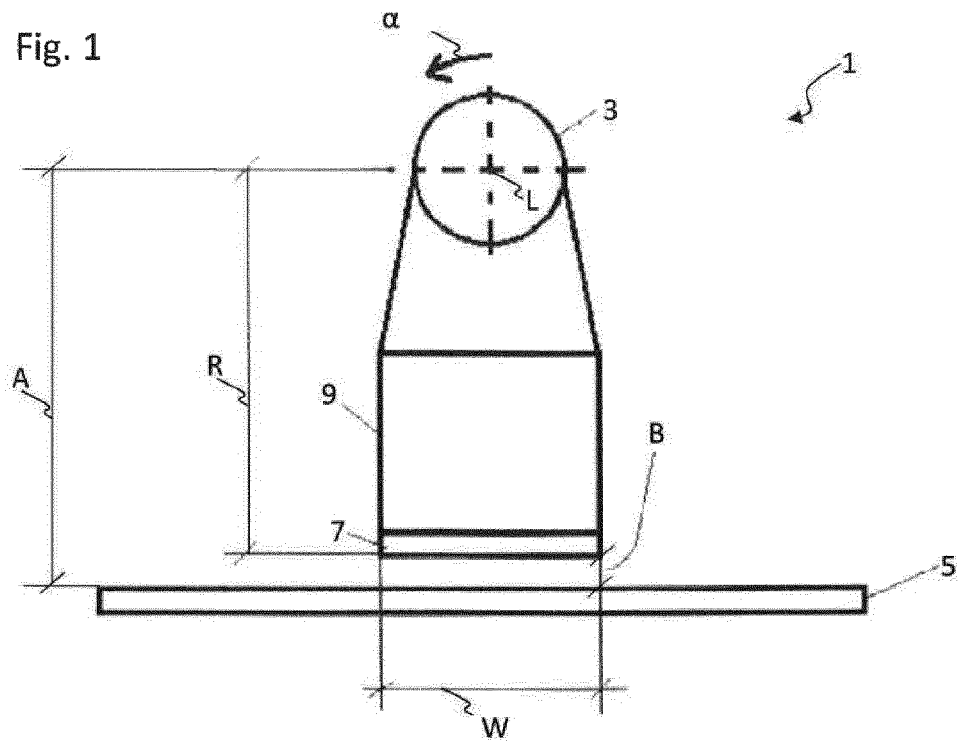
FIG. 1 shows a front view of a first exemplary embodiment of a sensor device for determining a displacement of a shaft along its longitudinal axis.

Some embodiments may include a sensor device for determining a displacement of a shaft along its longitudinal axis, which sensor device comprises a sensor unit which is radially arranged at a first distance from the longitudinal axis. The shaft can be displaced in relation to the sensor unit along the longitudinal axis.

The sensor device also comprises a detection element which is arranged between the shaft and the sensor unit. The detection element is fixedly coupled to the shaft radially at a second distance from the longitudinal axis. A side of the detection element facing away from the longitudinal axis is convex with respect to a plane perpendicular with respect to the longitudinal axis, in such a way that a gap distance between the detection element and the sensor unit varies over an extent of the sensor unit perpendicularly with respect to the longitudinal axis and independently of a tilting angle of the shaft.

The sensor unit is designed to generate a shaft displacement signal which is dependent on a displacement of the detection element in relation to the sensor unit along the longitudinal axis.

A convex formation of the detection element provides that an influence of a tilting angle of the shaft on a volume which is enclosed by overlapping of the detection element with any part of the sensor unit is small compared to a planar embodiment of the detection element. In this way a high level of precision and reliability of the determination of the displacement is made possible. As a result of a high level of precision of the sensor device, even in the case of tilting of the shaft about the tilting angle, for example a means of guiding the shaft which limits the tilting angle is merely optional. As a result, for example a round shaft can be inserted, with the result that a contribution is made to simple and cost-effective manufacture of the sensor device. In addition, the availability of bearings with an effective seal compared to ambient media in the case of round shafts contributes to a high level of reliability of the sensor device.

The shaft displacement signal therefore represents the displacement of the shaft with respect to the sensor unit along the longitudinal axis. The shaft displacement signal is, in particular, more accurate with respect to an actual displacement than in the case of a non-convex embodiment of the detection element.

In some embodiments, a curvature of the side of the detection element which faces away from the longitudinal axis is embodied in the plane perpendicular to the longitudinal axis so as to be essentially equal to a curvature of a circle in this plane, the radius of which circle corresponds to the second distance of the detector element from the longitudinal axis.

In some embodiments, the convex shape of the detection element with an essentially rotationally symmetrical surface curvature about the longitudinal axis provides a volume enclosed by the overlap of the detection element with the part of the sensor unit in question is essentially independent of a tilting angle of the shaft with the result that a high level of precision and reliability of the determination of the displacement becomes possible.

In some embodiments, the detection element is embodied as a lamellar. In the event of the lamellar being subjected to a magnetic field, damping which the magnetic field experiences as a result of the lamellar is representative of the displacement of the detection element with respect to the sensor unit.

In addition, for example a transformatory feedback is representative of the displacement of the detection element with respect to the sensor unit. As a result, simple determination of the displacement of the shaft along its longitudinal axis is made possible. For this purpose, the lamellar may comprise a conductive material.

In some embodiments, the detection element is embodied as a conductor loop. In the event of the conductor loop being subjected to a magnetic field, a transformatory feedback is representative of the displacement of the detection element with respect to the sensor unit. As a result, simple determination of the displacement of the shaft along its longitudinal axis is made possible. For this purpose, the conductor loop may comprise a conductive material in such a way that a conductor of the conductor loop surrounds at least a part of the detection element.

In some embodiments, the sensor unit comprises an exciter coil and at least one receiver coil. The exciter and the at least one receiver coil are embodied in such a way that a magnetic field which is generated by the exciter coil induces a respective voltage in the at least one receiver coil as a function of the displacement of the detection element with respect to the sensor unit. Such an arrangement may permit cost-effective and precise determination of the displacement of the shaft along its longitudinal axis. The sensor unit is designed to generate the shaft displacement signal as a function of the respective voltage.

In some embodiments, the detection element comprises a permanent magnet. The sensor unit comprises a Hall sensor which is penetrated, as a function of the displacement of the permanent magnet with respect to the sensor unit, by a magnetic field which is brought about by the permanent magnet. Such an embodiment may allow the system to determine the displacement of the shaft along its longitudinal axis by determining the magnetic field of the permanent magnet, with the result that a contribution is made to a simple manufacture of the sensor device. The sensor unit is designed to generate the shaft displacement signal as a function of the Hall voltage of the Hall sensor.

In some embodiments, the detection element is embodied as a permanent magnet. The sensor unit comprises a magneto-resistive sensor element which is penetrated, as a function of the displacement of the permanent magnet with respect to the sensor unit, by a magnetic field which is brought about by the permanent magnet. Such an embodiment may allow the system to determine the displacement of the shaft along its longitudinal axis all that is necessary is to determine the magnetic field of the permanent magnet, with the result that a contribution is made to simple space-saving manufacture of the sensor device.

The sensor unit is designed to generate the shaft displacement signal as a function of an electrical resistance of the magneto-resistive sensor element. The magneto-resistive sensor element may comprise, for example, as an anisotropic magnetic resistor (AMR), as a giant magnetic resistor (GMR) or as a tunnel magnetic resistor (TMR).

In some embodiments, the detection element comprises at least a first electrode of a capacitor. The sensor unit comprises at least a second electrode of the capacitor. The sensor unit is designed to generate the shaft displacement signal as a function of a capacitance of the capacitor.

Some embodiments may include an exhaust gas recirculation valve which is arranged in the exhaust gas train of an internal combustion engine in order to control an exhaust gas flow. The exhaust gas recirculation valve comprises an inlet and an outlet.

In addition, the exhaust gas recirculation valve comprises a valve seat with a valve disk which is coupled to a shaft which is embodied as a valve rod, with the result that the position of said valve disk with respect to the valve seat can be adjusted by means of a displacement of the shaft along its longitudinal axis.

The exhaust gas recirculation valve is designed to control the exhaust gas flow from the inlet to the outlet as a function of the position of the valve disk with respect to the valve seat. The exhaust gas recirculation valve also comprises a sensor device for determining the displacement of the shaft according to the first aspect.

As a result of the precise and reliable determination of the displacement of the shaft and the precise exhaust gas recirculation which is made possible thereby a contribution is made to efficient operation of the internal combustion engine.

Figure 2:
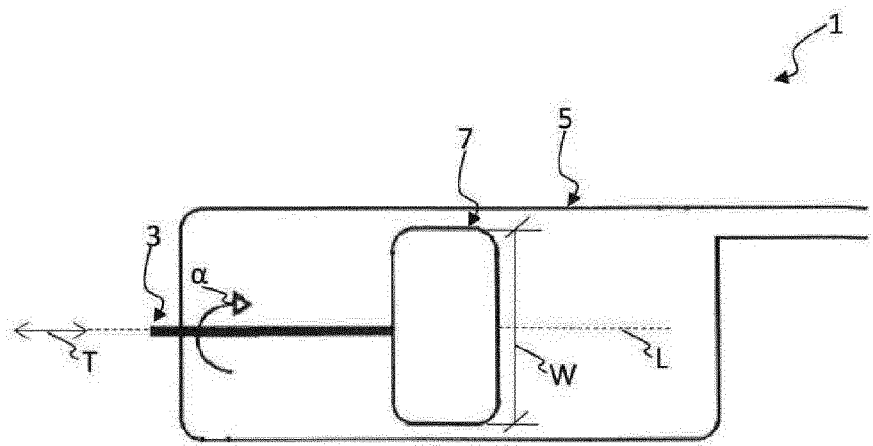
FIG. 2 shows the sensor device according to FIG. 1 in a plan view.

FIG. 1 and FIG. 2 each show a sensor device 1 for determining a displacement T of a shaft 3 along its longitudinal axis L from different perspectives. FIG. 1 illustrates a front view of the sensor device 1 with the longitudinal axis L perpendicular to the plane of the drawing.

The sensor device 1 comprises a sensor unit 5 for determining the displacement T of the shaft 3 at a first distance A radially with respect to the longitudinal axis L. For example, a side of the sensor unit 5 facing the longitudinal axis L is arranged, with respect to a plane perpendicular to the longitudinal axis L, tangentially with respect to a circle whose radius corresponds to the first distance A.

In addition, a detection element 7 is arranged between the sensor unit 5 and the shaft 3, said detection element 7 being fixedly coupled to the shaft at a second distance R radially with respect to the longitudinal axis L, for example with a coupling element 9. The coupling element 9 is embodied, for example, as a plastic dome which, for example, electrically isolates the shaft 3 from the detection element 7.

For example, the detection element 7 has, on its side facing the longitudinal axis L, at least one recess which is designed to couple in a positively locking fashion to the coupling element 9. For this purpose, the detection element 7 is encapsulated by injection molding, for example, on the coupling element 9.

In a neutral position of the shaft 3, for example in the event of, in the plane perpendicular to the longitudinal axis L, an axis through a center point of the detection element 7 and the longitudinal axis L being perpendicular to the sensor unit 5, or a tilting angle α of the shaft 3 between this axis and a surface normal of the sensor unit 5 being zero degrees, the detection element 7 is arranged, for example, parallel to the sensor unit 5.

A gap distance B between a side of the detection element 7 facing away from the longitudinal axis L and the side of the sensor unit facing the longitudinal axis L is constant in the plane perpendicular to the longitudinal axis L in a region W of an overlap of the detection element 7 in the neutral position of the shaft 3 and of the sensor unit 5.

FIG. 2 shows the sensor device 1 according to the first exemplary embodiment in a plan view, with the longitudinal axis L parallel to the plane of the diagram. The sensor unit 5 is designed to generate a shaft displacement signal which is dependent on a displacement of the detection element 7 in relation to the sensor unit 5 along the longitudinal axis L. In the neutral position of the shaft 3, the shaft displacement signal represents the displacement T of the shaft 3 with respect to the sensor unit 5 along the longitudinal axis L.

For example, as a result of vibrations or tilting of the sensor device 1 the tilting angle α of the shaft 3 can assume a value which is different from zero. In this case, the gap distance B between the side of the detection element 7 facing away from the longitudinal axis L and the side of the sensor unit 5 facing the longitudinal axis L is dependent on the tilting angle α in the region W. In particular, the shaft displacement signal is in this way subject, for example, to a measurement error.

Figure 3:
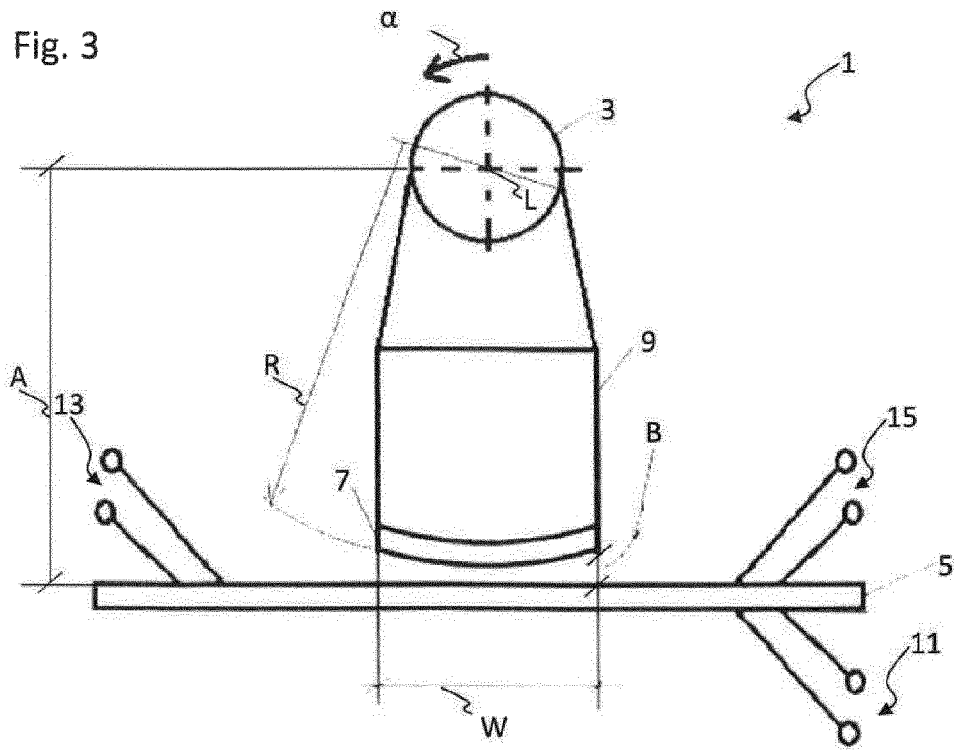
FIG. 3 shows a front view of a second exemplary embodiment of a sensor device for determining the displacement of the shaft along its longitudinal axis.

Therefore, a second exemplary embodiment (FIG. 3) differs from the first exemplary embodiment according to FIG. 1 in respect of an embodiment of the detection element 7. The detection element 7 is embodied in a convex fashion on its side facing away from the longitudinal axis L, with respect to the plane perpendicular to the longitudinal axis L. In particular, a curvature of the side of the detection element facing away from the longitudinal axis L in the plane perpendicular to the longitudinal axis L is equal to a curvature of a circle in this plane whose radius corresponds to the second distance R of the detection element 7 from the longitudinal axis L. In this way, in the region W the gap distance B may be independent of the tilting angle α.

The detection element 7 is embodied, for example, as a conductive lamellar. The sensor unit 5 comprises, for example, an exciter coil 11 as well as two receiver coils 13, 15, which are printed, for example, onto a printed circuit board.

For example, an alternating current flows through the exciter coil 11. A magnetic field which is generated by the exciter coil 11 experiences damping as a function of the displacement of the detection element 7, for example owing to eddy currents in the lamellar. The shaft displacement signal is generated by means of the exciter coils 13, 15 in which in each case a voltage is induced by the magnetic field generated by the exciter coil 11.

Figure 4:
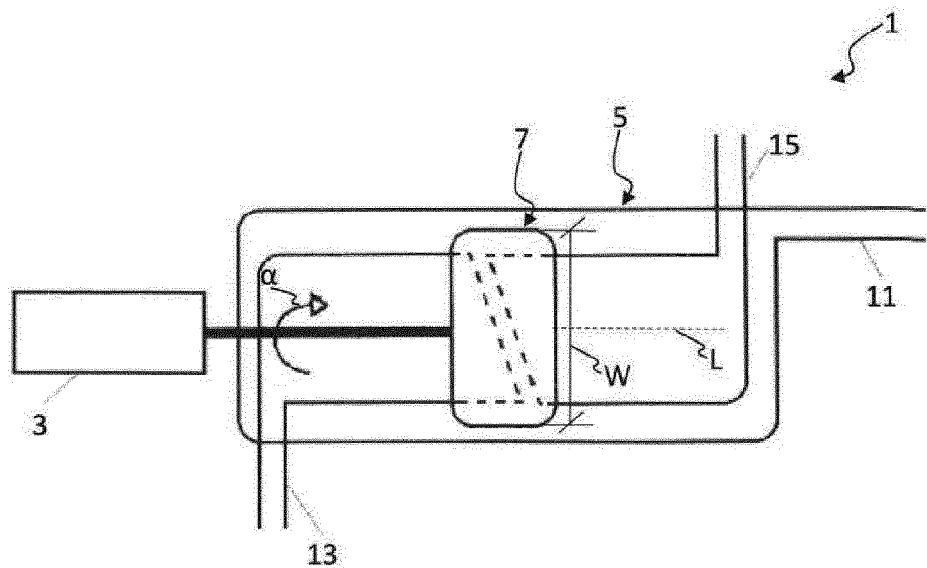
FIG. 4 shows the sensor device according to FIG. 3 in a plan view.

For example, in order to compensate a displacement of the shaft 3 in the plane perpendicular to the longitudinal axis L, in each case a conductor of the receiver coils 13, 15 has, in the region W in a plane parallel to the sensor unit 5, at the same time a component perpendicular to the longitudinal axis L and a component parallel to the longitudinal axis L (FIG. 4).

In this way, the shaft displacement signal can be determined with a particularly high resolution, for example by means of a difference signal of the receiver coils 13, 15. In particular as a result of the side of the detection element 7 which is embodied in a convex fashion, such an embodiment of the conductors of the receiver coils 13, 15 and therefore precise determination of the displacement T is made possible essentially independently of the tilting angle α of the shaft 3.

Figure 5:
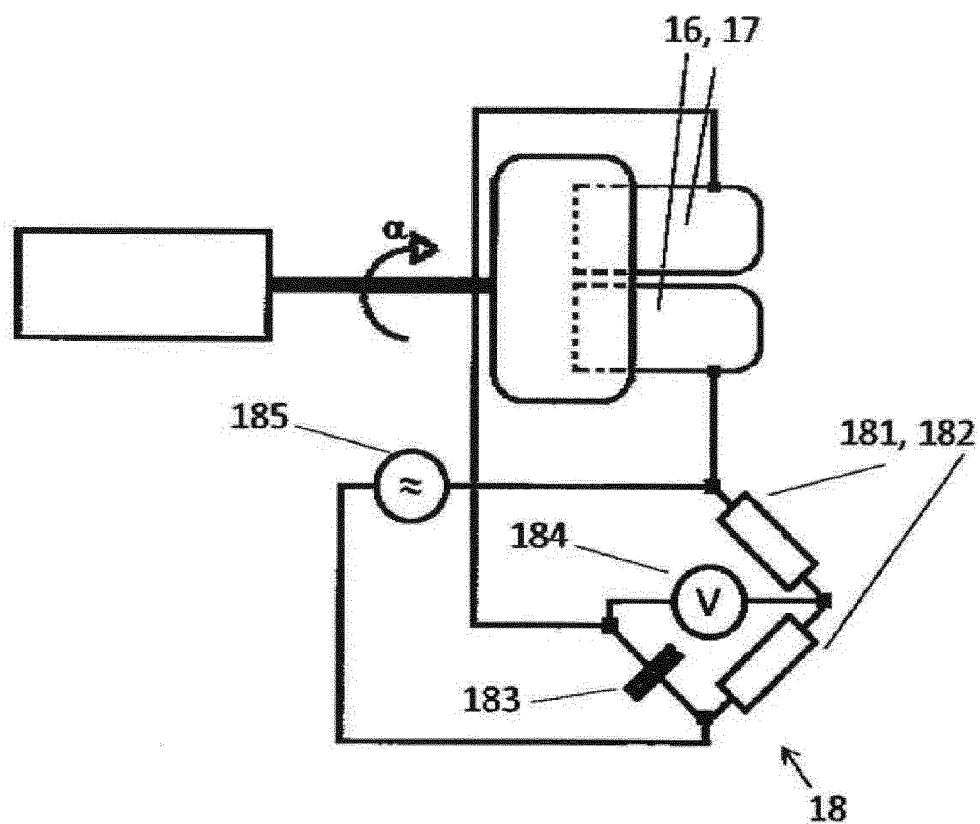
FIG. 5 shows a plan view of a third exemplary embodiment of a sensor device for determining the displacement of the shaft along its longitudinal axis.

A third exemplary embodiment (FIG. 5) differs from the second exemplary embodiment as a result of the fact that the sensor unit comprises two electrode faces 16, 17. These are capacitively coupled by means of the detection element 7 which is embodied as a conductive lamellar, and they form a capacitor which is dependent on the displacement of the detection element 7 in relation to the sensor unit 5 along the longitudinal axis L. In conjunction with bridge elements 181, 182, 183, a full bridge 18 is produced whose diagonal voltage which can be measured by means of the voltmeter 184 is dependent on the displacement of the detection element 7, wherein the bridge elements 181, 182 are each embodied as a resistor and produce a resistance half bridge and the bridge element 183 is embodied as a fixed-value capacitor. In addition, a bridge supply 185 is coupled to the full bridge 18.

In such embodiments, it is not necessary to form electrical contact with the detection element 7 and therefore no moving lines are installed. In addition, the detection element 7 is embodied on its side facing away from the longitudinal axis L in a convex fashion with respect to the plane perpendicular to the longitudinal axis L, with the result that the diagonal voltage represents the displacement T of the shaft 3 with respect to the sensor unit 5 along the longitudinal axis L essentially independently of the tilting angle α. Depending on dimensioning of the bridge elements 181, 182, 183, the diagonal voltage has only a negligible offset of the amplitude, which permits further processing with few errors, for example by means of differential amplifiers.

What is claimed is:

1. A sensor device for determining a displacement of a shaft along its longitudinal axis, the sensor device comprising:

a sensor unit disposed at a first radial distance from the longitudinal axis, wherein the shaft moves in relation to the sensor unit along the longitudinal axis;

a detection element arranged between the shaft and the sensor unit and fixedly coupled to the shaft at a second radial distance from the longitudinal axis;

wherein a first side of the detection element facing away from the longitudinal axis comprises a convex shape with respect to a plane perpendicular to the longitudinal axis and a gap distance defined between the detection element and the sensor unit varies over an extent of the sensor unit perpendicularly with respect to the longitudinal axis and independently of a tilting angle of the shaft;

wherein the sensor unit generates a shaft displacement signal dependent on a displacement of the detection element in relation to the sensor unit along the longitudinal axis.

2. The sensor device as claimed in claim 1, wherein a curvature of the first side of the detection element comprises a substantially circular curve in the plane perpendicular to the longitudinal axis, the circular curve having a radius corresponding to the second radial distance.

3. The sensor device as claimed in claim 1, wherein the detection element comprises a lamellar.

4. The sensor device as claimed in claim 1, wherein the detection element comprises a conductor loop.

5. The sensor device as claimed in claim 1, wherein:
the sensor unit comprises an exciter coil and at least one receiver coil; and
the exciter coil generates a magnetic field inducing a respective voltage in the at least one receiver coil, wherein a strength of the induced voltage depends on the displacement of the detection element with respect to the sensor unit.

6. The sensor device as claimed in claim 1, wherein:
the detection element comprises a permanent magnet; and
the sensor unit comprises a Hall sensor penetrated, as a function of the displacement of the permanent magnet with respect to the sensor unit, by a magnetic field which is brought about by the permanent magnet.

7. The sensor device claimed in claim 1, wherein: the detection element comprises a permanent magnet; and the sensor unit comprises a magneto-resistive sensor element which is penetrated, as a function of the displacement of the permanent magnet with respect to the sensor unit, by a magnetic field which is brought about by the permanent magnet.

8. The sensor device as claimed in claim 1, wherein:
the detection element comprises at least a first electrode of a capacitor; and
the sensor unit comprises at least a second electrode of the capacitor.

9. An exhaust gas recirculation valve arranged in the exhaust gas train of an internal combustion engine in order to control an exhaust gas flow, the recirculation valve comprising:

an inlet;

an outlet;

a valve seat with a valve disk coupled to a shaft comprises a valve rod;

wherein the position of the valve disk with respect to the valve seat can be adjusted by means of a displacement of the shaft along a longitudinal axis of the shaft;

wherein the exhaust gas recirculation valve controls the exhaust gas flow from the inlet to the outlet as a function of the position of the valve disk with respect to the valve seat;

a sensor unit disposed at a first radial distance from the longitudinal axis, wherein the shaft moves in relation to the sensor unit along the longitudinal axis;

a detection element arranged between the shaft and the sensor unit and fixedly coupled to the shaft at a second radial distance from the longitudinal axis;

wherein a first side of the detection element facing away from the longitudinal axis comprises a convex shape with respect to a plane perpendicular to the longitudinal axis and a gap distance defined between the detection element and the sensor unit varies over an extent of the sensor unit perpendicularly with respect to the longitudinal axis and independently of a tilting angle of the shaft;

wherein the sensor unit generates a shaft displacement signal dependent on a displacement of the detection element in relation to the sensor unit along the longitudinal axis.

* * * * *